US007124018B2

(12) United States Patent
Hassdenteufel et al.

(10) Patent No.: US 7,124,018 B2
(45) Date of Patent: Oct. 17, 2006

(54) METHOD FOR DIAGNOSING A TANK VENTING VALVE

(75) Inventors: Armin Hassdenteufel, Sachsenheim-Ochsenbach (DE); Andreas Mueller, Pforzheim (DE)

(73) Assignee: Robert Bosch GmbH, Stuttgart (DE)

( * ) Notice: Subject to any disclaimer, the term of this patent is extended or adjusted under 35 U.S.C. 154(b) by 23 days.

(21) Appl. No.: 10/859,000

(22) Filed: Jun. 1, 2004

(65) Prior Publication Data

US 2005/0015194 A1 Jan. 20, 2005

(30) Foreign Application Priority Data

Jun. 2, 2003 (DE) ................................ 103 24 813

(51) Int. Cl.
*G01M 15/10* (2006.01)

(52) U.S. Cl. ...................................... 701/114; 73/118.1

(58) Field of Classification Search ................ 701/103, 701/114; 73/116, 117.2, 117.3, 118.1, 119 R
See application file for complete search history.

(56) References Cited

U.S. PATENT DOCUMENTS 5,243,853 A * 9/1993 Steinbrenner et al. ..... 73/117.3
5,372,117 A * 12/1994 Denz et al. ................ 123/698
6,182,642 B1 * 2/2001 Ohkuma ..................... 123/520
6,739,310 B1 * 5/2004 Esteghlal et al. ........... 123/295
6,886,397 B1 * 5/2005 Esteghlal et al. .......... 73/118.1

FOREIGN PATENT DOCUMENTS

DE 39 14 536 11/1990
DE 100 43 071 3/2002

* cited by examiner

*Primary Examiner*—Andrew M. Dolinar
*Assistant Examiner*—Johnny H. Hoang
(74) *Attorney, Agent, or Firm*—Kenyon & Kenyon LLP

(57) ABSTRACT

A method for testing the operability of a tank venting valve between an internal combustion engine and a fuel vapor storage device of a motor vehicle. The stored fuel vapor from the fuel vapor storage device is fed to the internal combustion engine when the tank venting valve is open and a reaction from a fuel/air control loop is analyzed to diagnose the operability of the tank venting valve. In order to refine the method so that a diagnosis that is as far as possible not subject to error may be performed when not idling, the stored fuel vapor from the fuel vapor storage device is fed to the internal combustion engine at least twice in one driving cycle while the tank venting valve is open, a reaction of the fuel/air ratio control loop being detected each time and the operability of the tank venting valve being inferred by comparing the detected reactions.

4 Claims, 2 Drawing Sheets

METHOD FOR DIAGNOSING A TANK VENTING VALVE

FIELD OF THE INVENTION

The present invention relates to a method for diagnosing a tank venting valve in internal combustion engines.

BACKGROUND INFORMATION

Opening a tank venting valve during the operation of an engine and analyzing a reaction from a fuel/air ratio control loop for diagnosis is known. The fuel vapor mixed with air from the tank ventilation (purge gas) causes a disturbance of the control loop so that the occurrence of the disturbance indicates an operable tank ventilation and accordingly an operable tank venting valve in particular. Such a method is derived, for example, from German Patent Application No. DE 100 43 071. However, if a disturbance of the control loop does not occur due to a change in mixture, it is not possible to obtain clear information concerning the operability of the tank venting valve. Purely in principle, it is possible that the mixture that is fed to the internal combustion engine via an intact tank venting valve corresponds exactly to the same mixture that is fed to the internal combustion engine in any case. In this case, more extensive diagnosis is required. To this end, for example, diagnostic methods may be provided for testing actuators in the regulation and/or control of operating parameters in connection with idle-speed regulation, as derived, for example, from German Patent No. DE 39 14 536.

However, more extensive diagnoses of this kind may in part only be performed at idle-speed; in addition, they are often very time-intensive. Furthermore, they are often subject to error. As a result, the frequency of diagnosis may be limited.

An object of the present invention is therefore to provide a method for testing the operability of a tank venting valve to the end that a diagnosis is also possible when not idling, thereby greatly increasing the frequency of diagnosis. Furthermore, the method should be very immune to error.

SUMMARY OF THE INVENTION

This object is achieved using a method for testing the operability of a tank venting valve according to the present invention. The precision of the diagnosis is increased by feeding the stored fuel vapor from the fuel vapor storage device to the internal combustion engine at least twice in at least one operating state of the internal combustion engine while the tank venting valve is open. A reaction of the fuel/air ratio control loop is detected each time and the operability of the tank venting valve is inferred by comparing the detected reactions. The present invention assumes that the probability of the same mixture being routed via an intact tank venting valve as is fed to the internal combustion engine via the injection is relatively low. If the mixture test is repeated frequently, i.e., if the detection of the reaction of the fuel/air ratio control loop and the analysis of this reaction are repeated frequently, which in each case requires only a brief opening of the tank venting valve, it is very improbable that a stoichiometric mixture is routed via the tank venting valve every time within one driving cycle. This is a consequence of the fact that during the course of a trip, the fuel vapor storage device is emptied by purging and as a result the purge flow contains less and less fuel.

Advantageously, the detected reactions are analyzed statistically. This analysis makes it possible to infer a defective tank venting valve with very high probability.

In an advantageous embodiment, the number of deviations of the fuel/air ratio from a predefined value is detected and the operability of the tank venting valve is inferred from this. Preferably, a defective tank venting valve is always inferred when no deviations of the detected fuel/air ratio from the predefined fuel/air ratio are determined.

DETAILED DESCRIPTION

Figure 1:
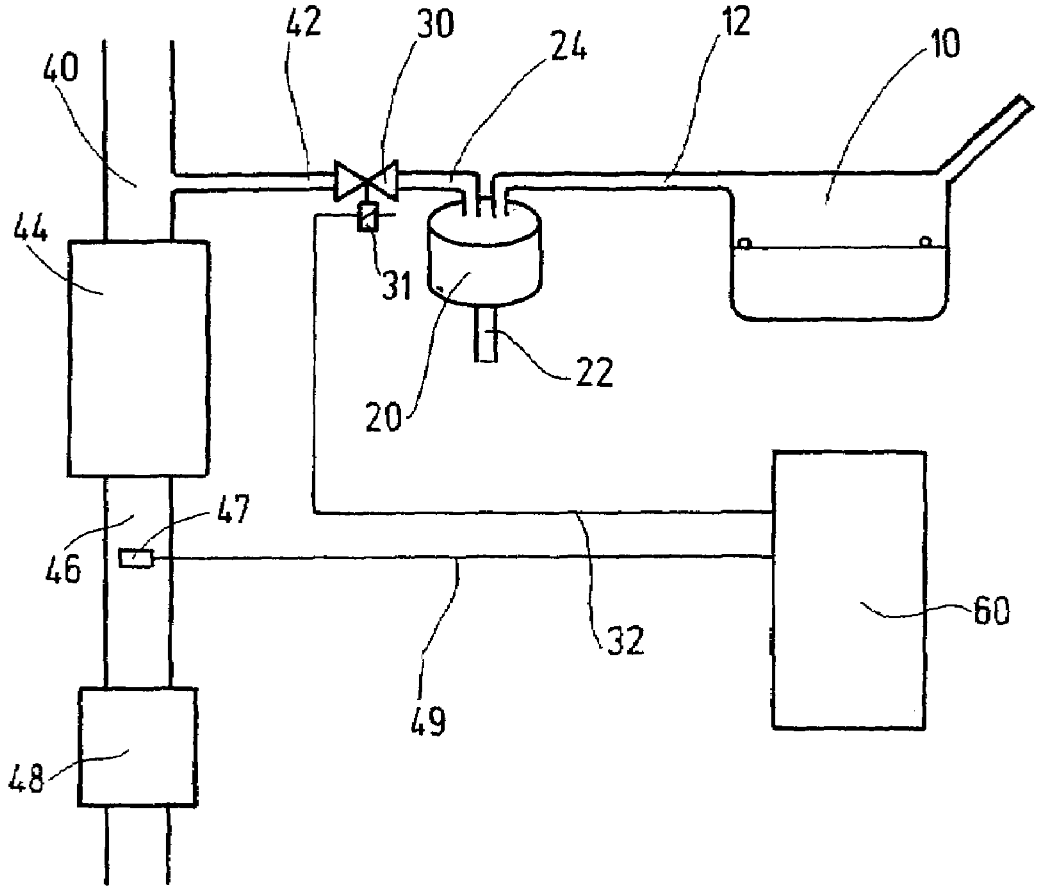
FIG. 1 shows a tank ventilation system of a motor vehicle in schematic form.

An exemplary embodiment of a tank ventilation system of a motor vehicle shown in FIG. 1 includes a tank 10, a fuel vapor storage device, an activated carbon filter 20, for example, which is connected to tank 10 via a filter line 12 and has a ventilation line 22, which may be connected with the environment, as well as a tank venting valve 30, which may be connected to activated carbon filter 20 via a valve line 24 and to an intake manifold 40 of an internal combustion engine 44 via a valve line 42. Tank venting valve 30 may be actuated by a circuit unit 60 using, for example, an electromagnetic actuator 31 via an electrical lead 32.

A lambda probe 47, which is known per Se, is situated upstream from a catalytic converter 48 in exhaust gas duct 46 of internal combustion engine 44 to detect the fuel/air ratio, the output signal of the lambda probe being fed to control unit 60 using an electrical lead 49.

The internal combustion engine is operated in a manner known per se in such a way that the fuel/air ratio assumes a stoichiometric value.

Figure 2:
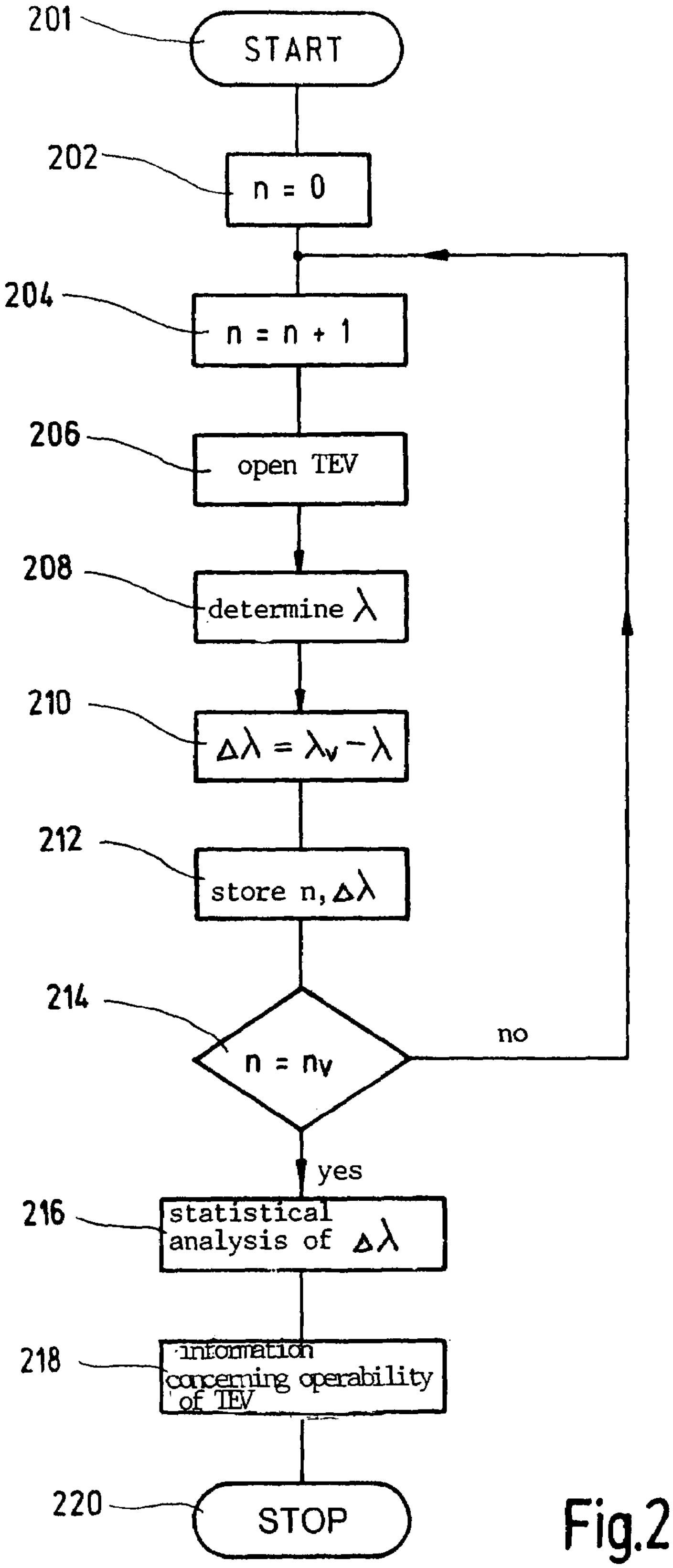
FIG. 2 shows a flowchart of a method utilizing the present invention for diagnosing the tank venting valve.

The test of the operability of the tank venting valve is described in greater detail below with reference to FIG. 2. The method is started in a step 201. Initially in a step 202, a value n, which characterizes the number of function tests performed, is set to zero. In a step 204, this value n is incremented by one. Thereupon, in a step 206, tank venting valve (TEV) 30 is actuated to open and fuel/air ratio $\lambda$ is determined by lambda probe 47 in a step 208. In control unit 60 a difference between a predefined lambda value $\lambda_v$ and detected lambda value $\lambda$ is then determined (step 210): $\Delta\lambda = \lambda_v - \lambda$ Value n and difference $\Delta\lambda$ thus calculated are stored in step 212. Thereupon, it is checked if value n corresponds to a predefined value $n_v$ (step 214). This value $n_v$ may be set, for example, to two, three, four, five or even ten, as a function of how frequently the tank venting valve is to be diagnosed by detecting the lambda value. If current value n does not correspond to predefined value $n_v$, the process is returned to step 204 in which value n is increased by one and tank venting valve 30 is again actuated to open and difference $\Delta\lambda$ is determined and stored together with value n. These steps are repeated until value n corresponds to predefined value $n_v$. In this case, a statistical analysis is performed on determined difference $\Delta\lambda$. From this analysis, information is obtained in step 218 concerning the operability of tank venting valve 30 and the method is stopped in step 220.

The present invention is based on the knowledge that the probability of the same mixture being routed via an intact tank venting valve 30 as is routed to internal combustion engine 44 via the injection is relatively low. If the mixture test is repeated frequently, meaning that when value $n_v$ of the predetermined number of repetitions of the mixture test is set to a correspondingly high value, with only a brief opening of tank venting valve 30, it is very improbable that a stoichiometric mixture is routed across tank venting valve 30 for each opening within one driving cycle. This must be ruled out merely due to the fact that in the course of one operating cycle of internal combustion engine 44, e.g., during a trip, activated carbon filter 20 is emptied by purging and accordingly less and less fuel is contained in the purge flow. After completion of a predefined number $n_v$ of such tests and the analysis of the mixture deviations performed in step 216, for example, the detection and analysis of the number of mixture deviations, it is possible to infer a defective tank venting valve with very high probability, for example, when no mixture deviation is determined in any of the tests, i.e., $\Delta\lambda$ is equal to zero. In this case the fuel/air ratio is not disturbed by opening tank venting valve 30 so that it is possible to infer an error in tank venting valve 30.

In the method described above, it is advantageous in particular that the diagnosis of tank venting valve 30 is not only substantially more reliable but it may also be run more frequently in particular. In this connection, it is a particular advantage that the diagnosis of tank venting valve 30 is also possible when the internal combustion engine is not idling. As a result, other function tests and tests of the function of the internal combustion engine, which must be performed during idling, are not blocked as often. A very important advantage of the method described above is also due to the fact that no additional components are required, which, for example, are necessary for testing actuators, the idle actuator and the like, for example.

What is claimed is:

1. A method for testing an operability of a tank venting valve between an internal combustion engine and a fuel vapor storage device of a motor vehicle, the method comprising:

feeding stored fuel vapor from the fuel vapor storage device to the engine at least twice in one driving cycle while the tank venting valve is open;

detecting each time a reaction from a fuel/air ratio control loop, the fuel/air ratio being detected in an exhaust gas duct of the internal combustion engine by a lambda probe; and inferring the operability of the tank venting valve by comparing the detected reactions.

2. The method according to claim 1, further comprising statistically analyzing the detected reactions.

3. The method according to claim 1, further comprising:

as a reaction of the fuel/air ratio control loop, detecting a number of deviations of a fuel/air ratio from a predefined fuel/air ratio value, and inferring the operability of the tank venting valve from the detected number of deviations.

4. The method according to claim 3, further comprising inferring a defective tank venting valve when no deviations from the predefined fuel/air ratio value are detected.

* * * * *